May 29, 1928.

J. LINDALL 1,671,533

BRUSH HOLDER FOR ELECTRIC MOTORS

Filed Jan. 21, 1927      2 Sheets-Sheet 1

Inventor
John Lindall
by Jas. H. Churchill
his Atty.

May 29, 1928.  
J. LINDALL  
1,671,533  
BRUSH HOLDER FOR ELECTRIC MOTORS  
Filed Jan. 21, 1927 2 Sheets-Sheet 2
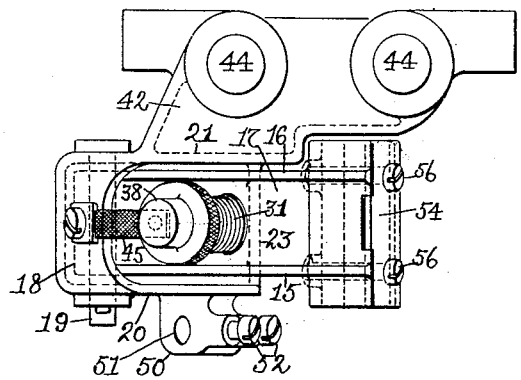
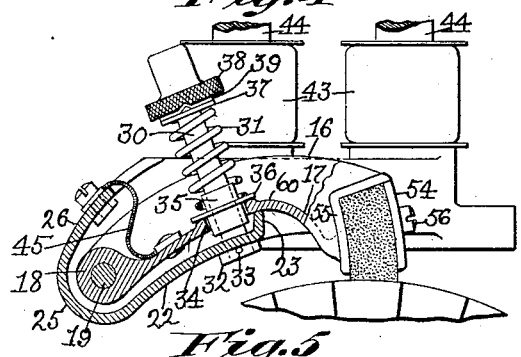
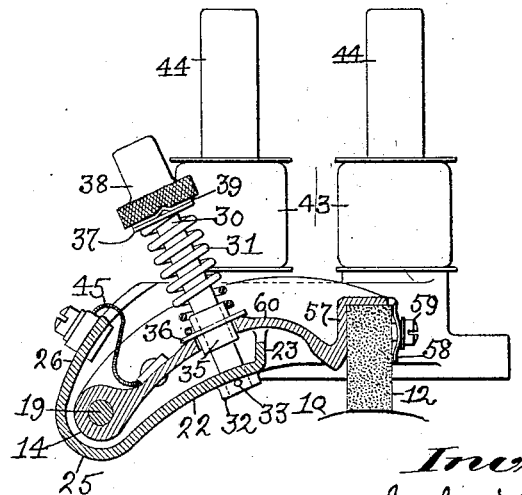
Inventor  
John Lindall  
by Jas. H. Churchill  
his Atty.

Patented May 29, 1928.

1,671,533

UNITED STATES PATENT OFFICE.

JOHN LINDALL, OF BOSTON, MASSACHUSETTS.

BRUSH HOLDER FOR ELECTRIC MOTORS.

Application filed January 21, 1927. Serial No. 162,467.

This invention has for its object to provide a simple, compact and efficient brush holder which is capable of substantial movement toward and from the commutator of the motor in close or narrow quarters, with the brush in fixed relation to the brush holder.

The brush holder is especially adapted for use with motors employed to propel railway cars having low floors below which the motor is located in substantially close proximity thereto.

To this end, the brush holder is provided with a supporting member having a bottom wall, and above which is located a lever pivoted at its rear end and having its front or free end to which the brush is firmly secured, extended beyond said bottom wall.

The brush-carrying lever is constructed so as to normally leave a substantial space between it and said bottom wall, so as to enable the lever to be moved by a spring the desired or required distance toward said bottom wall as will permit the brush rigidly attached to the lever to be worn the desired or required amount before being replaced.

The brush-carrying lever has co-operating with it a stop to limit its movement under the influence of the spring referred to, and thereby prevent contact of the lever with the commutator and avoid damage to the latter.

These and other features of this invention will be pointed out in the claims at the end of this specification.

Figure 1:
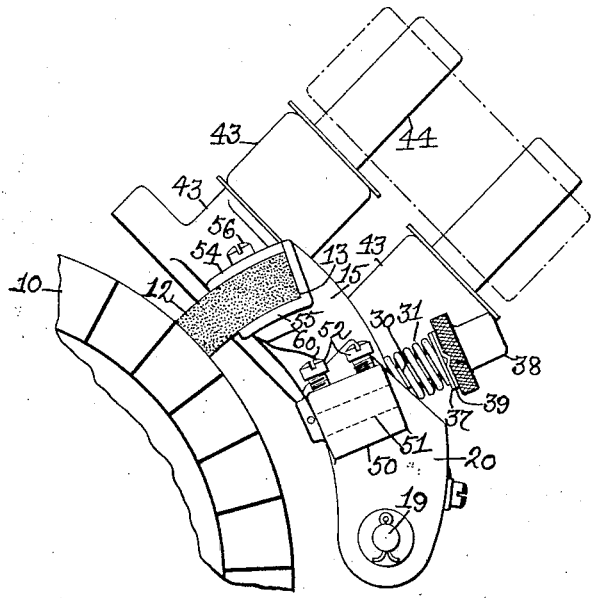
Figure 2:
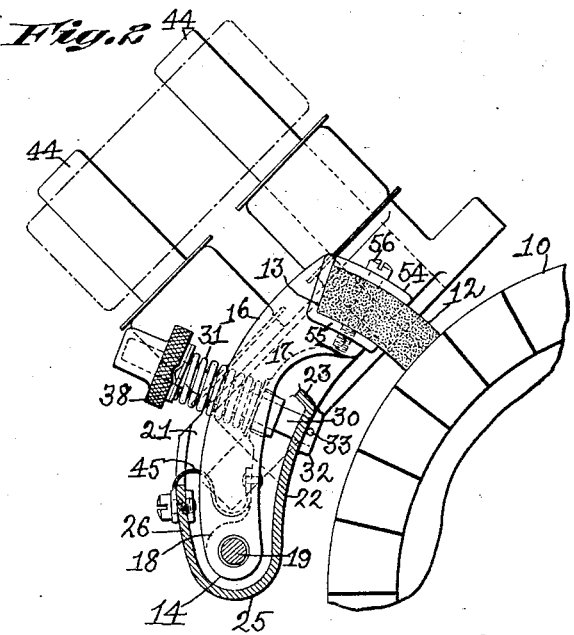

Fig. 1 is a side elevation of a portion of a commutator and a brush holder embodying this invention;

Fig. 2, a view like Fig. 1, with the casing for the brush holder shown in section;

Fig. 3, a plan of the brush holder shown in Fig. 2;

Fig. 4, a view like Fig. 2, showing the brush holder in the position it occupies when its brush has been worn out; and Fig. 5, a view like Fig. 2, showing a modified form of brush holder.

Referring to Figs. 1 to 4 inclusive, 10 represents the commutator of an electric motor such as is now commonly used on electric railway cars for propelling the same and which is mounted on the truck below the floor of the car.

The commutator 10 has co-operating with it a brush 12, of usual construction and herein represented as a block of carbon, which may be curved as represented in Figs. 1 to 4, and inserted into a curved socket 13 at the outer end of a lever 14 provided in the present instance with substantially parallel curved arms 15, 16 spaced apart and connected by a bottom member or web 17 attached to a hub 18, which is mounted to turn on a pivot pin 19 extended through the opposite side walls 20, 21 of a supporting member.

The supporting member referred to is provided in the present instance with a bottom wall 22, which extends but partially the length of the side walls 20, 21 and is provided at its front end with an upturned flange or wall 23, which co-operates with the bottom member 17 of the brush-holding lever 14 to limit the movement of the latter toward the commutator 10.

The bottom wall 22 has extended from it a curved rear end wall 25 from which extends a top wall 26, which is materially shorter than the bottom wall 22.

The top, end and bottom walls 26, 25 and 22 co-operate with the side walls, 20, 21 to form a casing or housing in which the rear portion of the brush-holding lever 14 is located, and which casing is open at its top for the passage into the casing and through the bottom wall 22 thereof, of a rod 30 for supporting a coiled or helical spring 31, by means of which the brush 12 is held in firm engagement with the commutator 10.

The rod 30 is extended below the bottom wall 22 into a boss 32 on the casing or housing and is secured thereto by a pin 33. The rod 30 is extended upwardly through an opening 34 in the bottom member 17 of the brush-holding lever 14, and has mounted on it a bushing or sleeve 35 provided between its ends with an annular flange 36, which bears upon the upper surface of the bottom member 17 of the lever 14.

The coiled spring 31 has its lower end bearing against the flange 36 and its upper end against a washer 37 mounted on the rod 30 below an abutment member shown as a cap or nut 38. A locking washer 39 for the cap or nut 38 is also preferably provided and mounted on the rod 30.

The side wall 16 of the casing is provided as shown with a laterally extended flange 42 (see Fig. 1) having one or more hubs 43 through which are extended stationary supporting members or rods 44.

The brush-holding lever 14 is electrically connected with the top wall 26 of the casing by a flexible conductor 45, which is fastened to the bottom member 17 of the lever 14 and to the top wall 26.

The side wall 15 of the casing or housing is provided with a terminal lug 50 having a bore 51 for the insertion of a conductor, not shown, and is provided with screws 52 by which said conductor is secured to said lug and housing.

The socket 13 for the brush 12 is preferably provided with a movable front wall 54 by which the brush 12 is firmly clamped against the opposite or rear wall 55 by means of screws 56, which extend through the brush and are engaged with threaded holes in the rear wall 55.

It may be preferred to use a curved brush and provide the brush holder with a curved socket as represented in Figs. 1 to 4, but it is not desired to limit the invention in this respect, as a straight brush 12 may be used with a holder having a straight rear wall 57 against which the brush is firmly held by a spring washer 58 and screw 59 as represented in Fig. 5.

In Figs. 1 and 2, the brush is represented as new and the pressure with which it bears against the commutator is controlled by adjusting the nut 38 on the rod 30 to compress the spring the proper or desired amount. As the brush is worn, the spring expands and moves the brush-holding lever 14 toward the bottom wall 22 of the casing, until the brush has been worn to the point where further movement of the lever toward the commutator should be prevented.

In the present instance, this point is reached when the lever 14 engages the front wall 23 of the casing, which wall acts as a stop to prevent further movement of the lever and its brush toward the commutator. At such time, the lever 14 is in the position represented in Fig. 4, and is removed from the commutator and prevented from contacting therewith.

It will be observed that the front end of the brush-carrying lever in the normal position of the latter, is extended below the bottom wall 22, (see Figs. 1 and 2), and to obtain the desired movement of the lever necessary to enable the brush 12 rigidly attached to the lever, to be worn the desired or required amount, as represented in Fig. 4, the brush-carrying lever has its intermediate portion suitably shaped to provide a substantial space between its under surface and the stop or front wall 23.

In the present instance the intermediate portion of the brush-carrying lever is provided with a relatively deep curved portion 60 by means of which the new brush 12, shown in Fig. 2, can be worn off to the extent represented in Fig. 4 when the lever is engaged with its stop 23.

It will further be observed, that the bottom wall 22 of the housing or supporting member and the brush-holding lever are curved and substantially concentric with the commutator, which enables the brush-holder to have its rear end in relatively close proximity to the commutator, and thereby enables the brush holder to be used in quarters where the space or headroom is restricted, as in the case of railway cars having low floors.

It will further be observed that the brush being in fixed relation to its holding lever co-operates with the commutator to obtain maximum electrical efficiency and avoids the so-called flash-overs, in which an arc starting at the brush contact extends until it reaches a grounded portion of the motor, with attending damage to the motor.

The bottom wall 22 of the supporting member serves not only as a means for anchoring the lower end of the rod 30 but also as a protection against damage to the connection 45 and the rear portion of the lever in case of severe arcing between the commutator and said bottom wall, especially as the voltage of the arc increases as it progresses away from the brush toward the pivot for the brush-carrying lever.

It will be observed by reference to Figs. 1, 2, 4 and 5 that the brush-carrying lever is of substantial length and has its pivot 19 substantially in a plane tangential to the commutator at the point of contact of the brush with the commutator, with the result that the point of contact of the nonadjustable brush as it wears remains substantially in the same radial plane passing through the brush at the initial point of contact of a new brush, which serves to maintain the efficiency of the apparatus at its maximum while the brush is being worn.

One embodiment of the invention is herein shown, but it is not desired to limit the invention to the particular construction shown.

What is claimed is:

1. In a brush holder for electric motors and the like provided with a commutator, in combination, a casing open at its top and provided with a bottom wall having an upturned front wall, a brush-holding lever having its rear end located within said casing and pivoted thereto and having its front end extended beyond the upturned front wall of said casing, a brush secured to the front end of said lever in fixed relation thereto, a rod affixed at its lower end to the bottom wall of said casing and extended upwardly through said lever and out of said casing through the opening in its top, a sleeve mounted on said rod and provided with a flange for engaging said lever, a spring encircling said rod above said lever and co-operating with said flange, and a nut on the upper end of said rod co-operating with said spring to compress the same and thereby adjust the pressure of the brush upon said commutator, said upturned front wall of said casing co-operating with said lever to limit movement of the latter toward the commutator when the brush has been worn a predetermined amount.

2. In a brush holder for electric motors and the like provided with a commutator, in combination, a casing provided with a bottom wall, a brush-holding lever having its rear end pivoted within said casing and its front end extended out of said casing, a brush secured in fixed relation to the front end of said lever to engage said commutator, a spring-supporting member affixed at its lower end to said bottom wall and extended upwardly above said lever, an abutment member on said spring-supporting member, and a spring on said supporting member between said abutment and said lever and acting on the latter to move it toward said bottom wall, and a stop co-operating with said lever to limit its movement by said spring.

3. In a brush holder for electric motors and the like provided with a commutator, in combination, a brush-holding lever pivoted at its rear end and provided at its front end with a brush secured in fixed relation thereto to move as one piece therewith, a supporting member to which said lever is pivoted substantially in a plane tangential to the commutator at the point of contact of the brush therewith, a rod extended above and below said lever and secured at its lower end to said supporting member, an abutment member on said rod above said lever, a spring on said rod between said abutment member and said lever and acting on the latter to move it toward said commutator, and means to limit the movement of said lever by said spring.

4. In a brush holder for electric motors and the like provided with a commutator, in combination, a supporting member, a brush-holding lever provided with a brush secured thereto in fixed relation to move as one piece therewith and having its pivot at a substantial distance from the point of contact of the brush with the commutator and substantially in a plane tangential to the commutator at the said point of contact, a rod extended above and below said brush-holding lever and fastened at its lower end to said supporting member, a helical spring mounted on said rod above said lever, and means on the said rod for compressing the said spring between it and the brush-holding lever.

In testimony whereof, I have signed my name to this specification.

JOHN LINDALL.